United States Patent [19]

Hannibal et al.

[11] Patent Number: 5,404,845
[45] Date of Patent: Apr. 11, 1995

[54] VALVE MECHANISM FOR AN INTERNAL-COMBUSTION ENGINE

[75] Inventors: Wilhelm Hannibal; Klaus Fuob, both of Neckarsulm, Germany

[73] Assignee: Audi AG, Germany

[21] Appl. No.: 217,155

[22] Filed: Mar. 24, 1994

[30] Foreign Application Priority Data

Apr. 1, 1993 [DE] Germany .............. 43 10 735.4

[51] Int. Cl.⁶ .................. F01M 9/10; F01L 1/18; F01L 1/26
[52] U.S. Cl. .................. 123/90.16; 123/90.34; 123/90.44; 123/90.22
[58] Field of Search ............ 123/90.15, 90.16, 90.21, 123/90.22, 90.33, 90.34, 90.6, 90.39, 90.4, 90.41, 90.44

[56] References Cited

U.S. PATENT DOCUMENTS

| | | | |
|---|---|---|---|
| 4,441,465 | 4/1984 | Nakamura | 123/90.34 |
| 4,644,912 | 2/1987 | Umeha et al. | 123/90.34 |
| 4,662,323 | 5/1987 | Moriya | 123/90.27 |
| 4,876,916 | 10/1989 | Maier | 123/90.34 |
| 5,095,859 | 3/1992 | Iwata et al. | 123/90.16 |
| 5,101,778 | 4/1992 | Fukuo et al. | 123/90.16 |
| 5,186,128 | 2/1993 | Murata et al. | 123/90.16 |
| 5,186,129 | 2/1993 | Magnan et al. | 123/90.34 |

FOREIGN PATENT DOCUMENTS 117907  5/1989  Japan .................. 123/90.34

*Primary Examiner*—Andrew M. Dolinar
*Assistant Examiner*—Weilun Lo
*Attorney, Agent, or Firm*—Lalos & Keegan

[57] ABSTRACT

A valve mechanism for an internal-combustion engine with at least two valves 1 per cylinder which can be actuated by cams 2, 7 of a camshaft 3 via rockers 4, 6. The rockers are mounted pivotally next to one another on a common fixed shaft 5, and they bear with sliding surfaces 8 against their cams. The rockers are pressed against one another by a spring 10, and their sliding surfaces 8 are aligned at least intermittently with one another and then form an essentially continuous surface. The camshaft 3 has a longitudinal channel 13 which is connected to a lubricant source and from which extends, for the lubrication of a plurality of sliding surfaces, a lubricating-oil bore 14 which opens out on the circumferential surface of a cam 7 cooperating with one of these sliding surfaces.

13 Claims, 2 Drawing Sheets

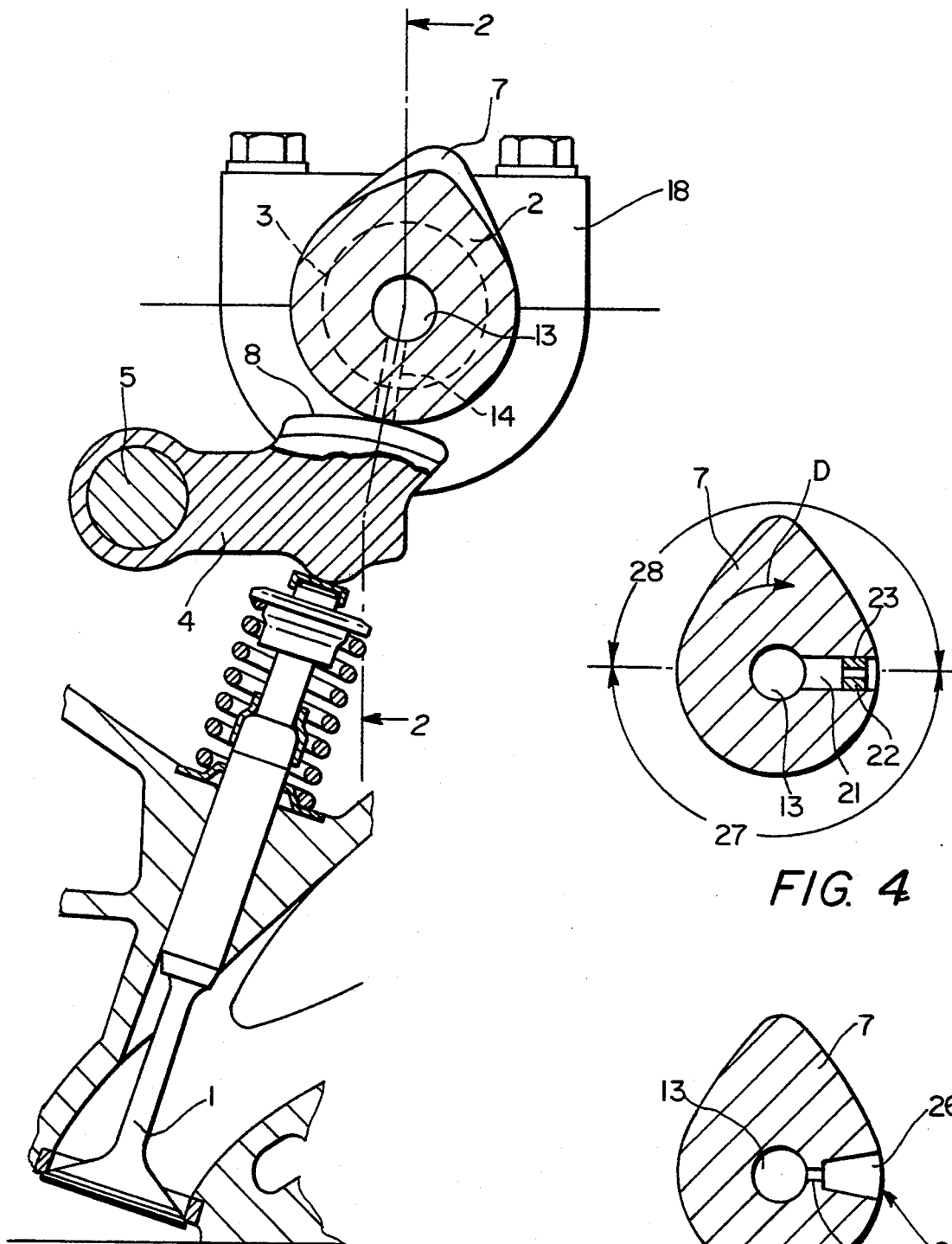
FIG. 1
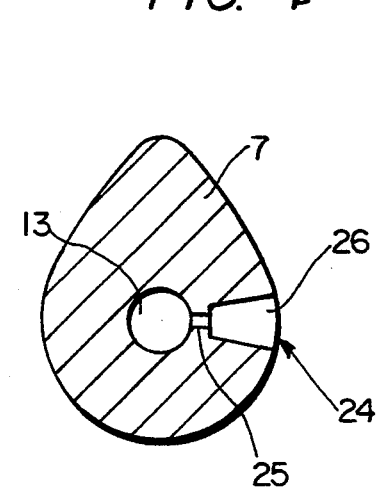
FIG. 4
FIG. 5

VALVE MECHANISM FOR AN INTERNAL-COMBUSTION ENGINE

BACKGROUND OF THE INVENTION

The invention relates to a valve mechanism for an internal-combusion engine.

In a known valve mechanism of the relevant generic type (e.g. EP 275,715), the lubrication of the sliding surfaces of the rockers takes place via bores connected to lubricating-oil lines which are arranged above the camshaft and parallel to the latter. At the same time, each rocker sliding surface or each cam has its own bore. This method of lubrication involves an extremely high outlay.

The object of the invention is to provide a valve mechanism of the relevant generic type, in which the lubrication of the rocker sliding surfaces takes place at a substantially lower outlay.

In the known valve mechanism, the rockers and their sliding surfaces are arranged at a distance from one another. Whereas, in the proposal according to the invention the rockers bear against one another, specifically in such a way that their sliding surfaces are aligned at least intermittently with one another and form an essentially continuous surface. This occurs whenever at least the base circles of the cams are identical. The lubrication of this surface consisting of a plurality of sliding surfaces can take place via one or more lubricating-oil bores, but in this case the number of lubricating-oil bores is smaller than the number of sliding surfaces. It has been shown that, at least in an arrangement of three rockers cooperating with their own cams, a lubricating-oil feed to the sliding surface of the middle rocker is sufficient also to lubricate the sliding surfaces of the two outer rockers, since the lubricating oil is then distributed over the sliding surfaces of all the rockers when these sliding surfaces are aligned with one another. In a valve mechanism having four rockers per cylinder, which are actuated by the cams of a common camshaft, it is expedient to provide lubricating-oil bores for the two middle rockers, in order to achieve a uniform lubrication of all the sliding surfaces. In a valve mechanism having five rockers cooperating with their own cams, a lubricating-oil bore for the middle rocker can be sufficient for lubricating all the rocker sliding surfaces, but it can prove expedient, in this case, to provide a lubricating-oil bore for the second and the fourth rocker each. In all instances, however, the number of lubricating-oil bores is smaller than the number of rocker sliding surfaces, so that these bores can have a larger diameter than in an arrangement in which a lubricating-oil bore is provided for each rocker and should have only a small diameter in order to keep the throughflow low. Larger bores can be produced more easily and are less inclined to become clogged. In the proposal according to the invention, therefore, a reliable lubrication of a plurality of rocker sliding surfaces is achieved by means of a smaller number of larger lubricating-oil bores.

The lubricating-oil feed can take place according to EP 275,715 or, as is known, for example, from German Offenlegungsschrift 2,703,519, by feeding the lubricating oil to the cam sliding surfaces through a longitudinal channel in the camshaft.

In order to ensure that the rockers of each rocker group assigned to a cylinder bear against one another, it is preferable to arrange an outer rocker so as to be axially non-displaceable, for example in bearing contact at a bearing point of the rocker shaft, and to mount the remaining rockers on the common shaft so as to be axially displaceable and provide means which exert on all the other outer rockers an axial force acting in the direction of the first outer rocker, in order to press all the remaining rockers against one another and against the first outer rocker. This axial force can be generated by a spring which is provided between the second outer rocker and a fixed support. This support can itself be formed by a retention or a mounting of the common pivot shaft.

Although, in the proposal according to the invention, the lubricating-oil bores in the cam or cams can have a larger diameter than in an arrangement of a lubricating-oil bore in each cam, the production of relatively long bores of this type presents problems. In order to remedy this, according to another feature of the invention, a nozzle having a smaller passage cross-section is inserted into the lubricating-oil bore. The lubricating-oil bore itself can thus have a larger diameter and be produced without difficulty. The nozzle preferably consists of a material which is softer than the material of the cam, so that, when pressed into the bore, it can experience deformation and the accuracy of the bore can be kept low. Alternatively, the lubricating-oil bore can have a first portion of small diameter adjacent to the longitudinal channel and a second portion of larger or increasing diameter adjacent to the first portion and reaching as far as the cam contact surface. By this means too, the production of the lubricating-oil bore becomes simpler and easier, since only a short portion of the lubricating-oil bore has a small diameter. This short portion can be produced by drilling or also by laser beam.

The supply of the longitudinal channel with lubricating oil preferably takes place via a camshaft bearing. A camshaft bearing of this type conventionally has a screwed-on bearing cover with passage holes for screws. So that a passage hole of this type can be provided at as short a distance as possible from the camshaft on one side of the camshaft, the supply of lubricating oil to the longitudinal channel takes place via an eccentric circumferential groove in the bearing surface of the camshaft bearing, the radial width of this circumferential groove being very small or even zero on one side of the camshaft, so that, on this side, the passage bore can be brought very close to the camshaft. The feed of lubricant takes place in the wider region of the circumferential groove. The transfer of lubricating oil out of the circumferential groove into the longitudinal channel in the camshaft takes place by means of a transverse bore passing through diametrically in the camshaft.

Other objects and advantages of the present invention will become more apparent to those persons having ordinary skill in the art to which the present invention pertains from the following description taken in conjunction with the accompanying drawings wherein:

BRIEF DESCRIPTION OF THE DRAWINGS

FIG. 1 shows a section of a valve mechanism of an internal-combusion engine with three inlet valves along the line 1—1 in FIG. 2;

FIG. 4 shows a cross-section of a cam with a lubricating-oil bore into which a nozzle is inserted; and FIG. 5 shows a cross-section of a cam with a stepped lubricating-oil bore.

DESCRIPTION OF THE PREFERRED EMBODIMENT

Figure 2:
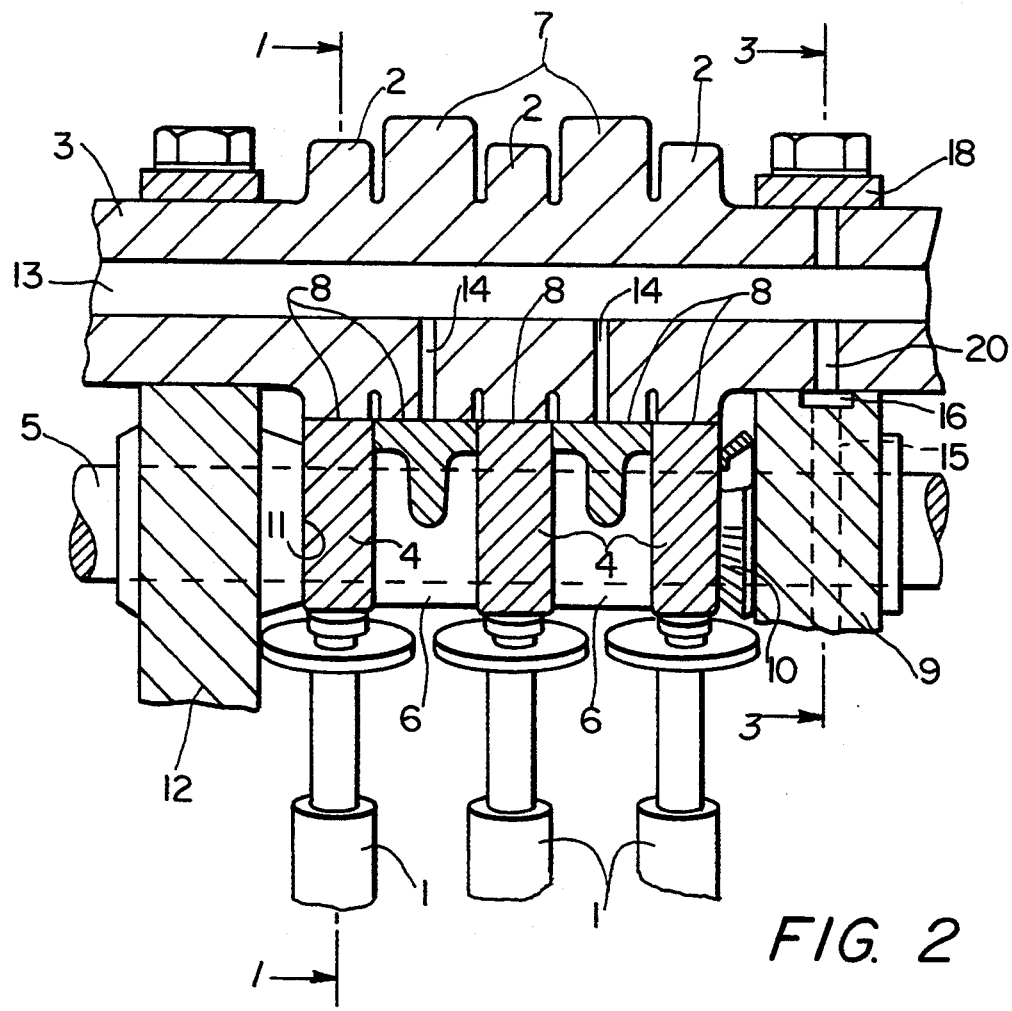
FIG. 2 shows a section along line 2—2 in FIG. 1.

The valve mechanism according to FIGS. 1 and 2 is intended for actuating three inlet valves 1 of a cylinder of an internal-combustion engine. The valves 1 are actuated by cams 2 of a camshaft 3 via rocker 4 which are mounted pivotally on a common shaft 5. Arranged on the pivot shaft 5 between adjacent first rockers 4 are second rockers 6 which cooperate with second cams 7 of the camshaft 3. The cam contours of the first cams 2 are designed according to the desired opening time of the desired stroke in the lower and medium speed range of the internal-combustion engine, whilst the cam contours of the second cams 7 are designed for the ratios in the upper speed range. The first rockers 4 can be coupled together with the second rockers 6 in the high-speed range by means of devices which are not shown, but which are known, for example, from DE-C-3,800,347, so that the valves 1 are then actuated according to the contour of the second cams 7. The cams 2 and 7 have identical base circles.

The rockers 4 and 6 bear with sliding surfaces 8 against the associated cams 2 and 7 respectively. The rockers 4 and 6 are arranged on the pivot shaft 5 so as to be axially displaceable and, as is evident from FIG. 2, bear against one another. As a result, the sliding surfaces 8, at least then when they run on the base circles of their cams 2 and 7, form a continuous surface, as is likewise evident from FIG. 2. In order to ensure that the rockers 4 and 6 bear against one another, there is arranged between the retention or mounting 9, on the right in FIG. 2, of the pivot shaft 5 and the adjacent outer right-hand rocker 4 a cup spring 10 which presses the rockers in FIG. 2 to the left into bearing contact against one another and the left-hand outer rocker 4 into bearing contact against a face 11 on the left-hand mounting or retention 12 of the pivot shaft 5.

To lubricate the sliding surfaces 8, a longitudinal channel 13, from which extend two lubricating-oil bores 14 opening out on the circumference of the second cams 7, is provided in the camshaft 3. Because, as mentioned, all the sliding surfaces 8 lie in one plane, at least then when they run on the base circles of their cams, two lubricating-oil bores 14 are sufficient for lubricating all the sliding surfaces, since the oil can be distributed over all the sliding surfaces. Under some circumstances, it is also sufficient to have a single bore 14 which would then preferably be provided in the middle cam 2. Because, in this arrangement, the number of lubricating-oil bores 14 is in all instances smaller than the number of sliding surfaces 8 to be lubricated, the bores can have a larger diameter, with the result that, in addition to the reduced number of bores, production is simplified.

The pressing of the rockers against one another has an additional advantage in a valve mechanism corresponding, for example, to that of De-C-3,800,347, in which there are arranged in the first and second rockers radial bores which must be aligned with one another in the base-circle phases of the rockers, in order to allow the displacement of coupling bolts for the purpose of coupling the rockers. In the invention, this alignment is ensured automatically by the pressing of the rockers against one another by means of the spring 10.

Of course, the invention is not restricted to a valve mechanism for three inlet valves per cylinder with variable valve control, but can, in general, be used where at least two valves are actuated by rockers (rocker levers or rocker arms) of cams of a common camshaft, and the valves can be inlet and/or outlet valves.

Figure 3:
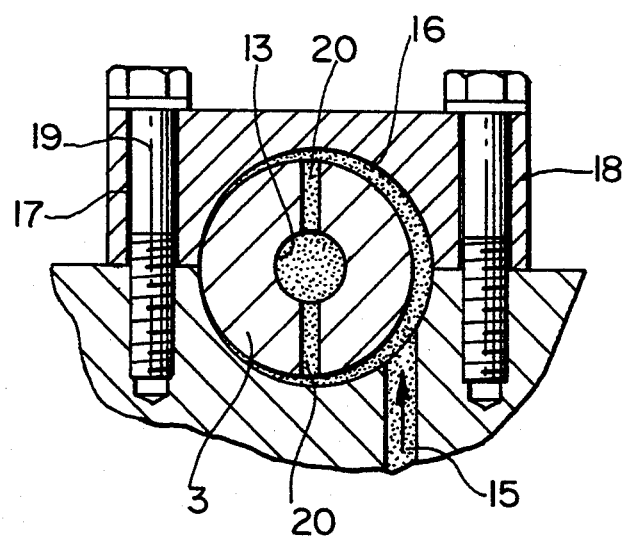
FIG. 3 shows a section along line 3—3 in FIG. 2.

In the exemplary embodiment, the feed of the lubricating oil to the longitudinal channel 13 in the camshaft 3 takes place through a channel 15 in the camshaft bearing located on the right in FIG. 2. As is evident from FIG. 3, there is provided in the bearing surface of this bearing an eccentric circumferential groove 16, the radial width of which is zero on the left-hand side and at its greatest on the right-hand side. The eccentric circumferential groove makes it possible to bring a passage hole 17 in the bearing cover 18 of this camshaft bearing, serving for leading through a fastening screw 19, very close to the camshaft 3, without the circumferential groove 16 being cut into by the passage hole 17. Provided in the plane of the circumferential groove 16 is a transverse bore 20 which passes diametrically through the camshaft 3 and through which the lubricating oil can flow out of the circumferential groove 16 into the longitudinal channel 13. The oil-feed channel 15 opens into the wide region of the circumferential groove 16 which, as is evident, extends over more than 180° around the camshaft 3. This ensures that sufficient oil can overflow from the circumferential groove 16 into the transverse bore 20.

Although, as a result of the proposed arrangement of the sliding surfaces 8, the lubrication of these sliding surfaces can take place via lubricating-oil bores 14, the number of which is smaller than the number of sliding surfaces and which can therefore have a larger diameter, the production of relatively long and thin bores in the camshaft present problems. To remedy this, in the cam shown in FIG. 4 the lubricating-oil bore 21 is designed with a relatively large diameter, and there is inserted into this lubricating-oil bore a nozzle 22 having a passage hole 23, the diameter of which is selected so that a sufficient, but not excessive quantity of lubricating oil passes onto the sliding surface of the rocker cooperating with this cam 7. The relatively large lubricating-oil bore 21 can be produced without difficulty. The nozzle 22 is pressed into the lubricating-oil bore 21, the nozzle 22 preferably consisting of a softer material than the cam 7, so that the accuracy of the lubricating-oil bore 21 can be low, since the nozzle 22 can experience deformation when it is being pressed in.

Alternatively, according to FIG. 5, there can be provided in the cam 7 a stepped lubricating-oil bore 24 which has a first portion 25 of small diameter adjacent to the longitudinal channel 13 and a second portion 26 of larger or increasing diameter adjacent to the said portion 25 and reaching as far as the cam contact surface. The portion 26 can be provided as early as during the casting of the cam or, in the case of a cylindrical bore of correspondingly large diameter, can be pre-drilled, whilst the portion 25 is drilled by means of a drill, but preferably by means of a laser beam. An extremely accurate production of the lubricating-oil bore can thereby be achieved at relatively low outlay.

In the versions according to FIG. 4 and 5, the lubricating-oil bores open out in the region of the base circle 27 of the cam 7, specifically at the start of the base circle in relation to the direction of rotation D of the cam. This ensures that the sliding surfaces 8 are supplied with lubricating oil when the elevation region 28 of the cam 7 runs onto them.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. Valve mechanism for an internal-combustion engine with at least two valves (1) per cylinder which can be actuated by cams (2, 7) of a camshaft (3) via at least two respective rockers (4, 6) which are mounted pivotally next to one another on a common fixed shaft (5) and which bear with sliding surfaces (8) against the cams, these sliding surfaces being lubricated by the supply of a lubricant, characterized in that the rockers (4, 6) bear against one another, and their sliding surfaces (8) are aligned at least intermittently with one another and then form an essentially continuous surface so that it is not necessary to provide each cam with a bore for the lubrication of the sliding surfaces.

2. Valve mechanism according to claim 1, characterized in that a first outer rocker (4) of each rocker group assigned to a cylinder is arranged so as to be axially non-displaceable, and the remaining rockers are mounted on the common shaft (5) so as to be axially displaceable, and in that there are provided means (10) which exert on a second outer rocker (4) an axial force acting in the direction of the first outer rocker, in order to press all the remaining rockers against one another and against the first outer rocker.

3. Valve mechanism according to claim 1, characterized in that the rockers (4, 6) of each rocker group assigned to a cylinder are mounted on the common shaft (5) so as to be axially displaceable, in that a fixed stop (11) is provided for a first outer rocker (4), and in that there are provided means (10) which exert on a second outer rocker (4) an axial force acting in the direction of the first outer rocker, in order to press all the rockers against one another and the first rocker against the stop (11).

4. Valve mechanism according to claim 2 or 3, characterized in that there is provided for exerting the axial force a spring (10) which is provided between the second outer rocker and a fixed support (9).

5. Valve mechanism according to claim 4, characterized in that the support (9) is formed by a retention of the common shaft (5).

6. Valve mechanism according to claim 1, characterized in that the camshaft (3) has a longitudinal channel (13) which is connected to a lubricant source and from which extends, for the lubrication of a plurality of sliding surfaces, a lubricating-oil bore (14) which opens onto the circumferential face of a cam (7) cooperating with one of the sliding surfaces.

7. Valve mechanism according to claim 6, characterized in that, in an arrangement of three or five rockers cooperating with their own cams, the lubricating-oil bore is provided in a middle cam.

8. Valve mechanism according to claim 6, characterized in that, in an arrangement of five rockers cooperating with their own cams, a lubricating-oil bore (14) is provided in a second and in a fourth cam (7).

9. Valve mechanism according to claim 6, characterized in that a nozzle (22) having a smaller passage cross-section is inserted into the lubricating-oil bore (21).

10. Valve mechanism according to claim 9, characterized in that the nozzle (22) consists of a material which is softer than the material of the cam.

11. Valve mechanism according to claim 6, characterized in that the lubricating-oil bore (24) has a first portion (25) of small diameter adjacent to the longitudinal channel (13) and a second portion (26) of larger or increasing diameter adjacent to the said portion (25) and reaching as far as a cam contact surface.

12. Valve mechanism according to claim 11, characterized in that the first portion (25) of the lubricating-oil bore (24) is produced by laser-beam drilling.

13. Valve mechanism according to claim 6, characterized in that, for supplying lubricating oil to the longitudinal channel (13), there is provided in the bearing surface of a camshaft bearing an eccentric circumferential groove (16), into which an oil-feed bore (15) opens, and in that the camshaft (3) is provided, in the plane of the circumferential groove (16), with a transverse bore (20) passing diametrically through the camshaft.

* * * * *